United States Patent Office 3,070,962
Patented Jan. 1, 1963

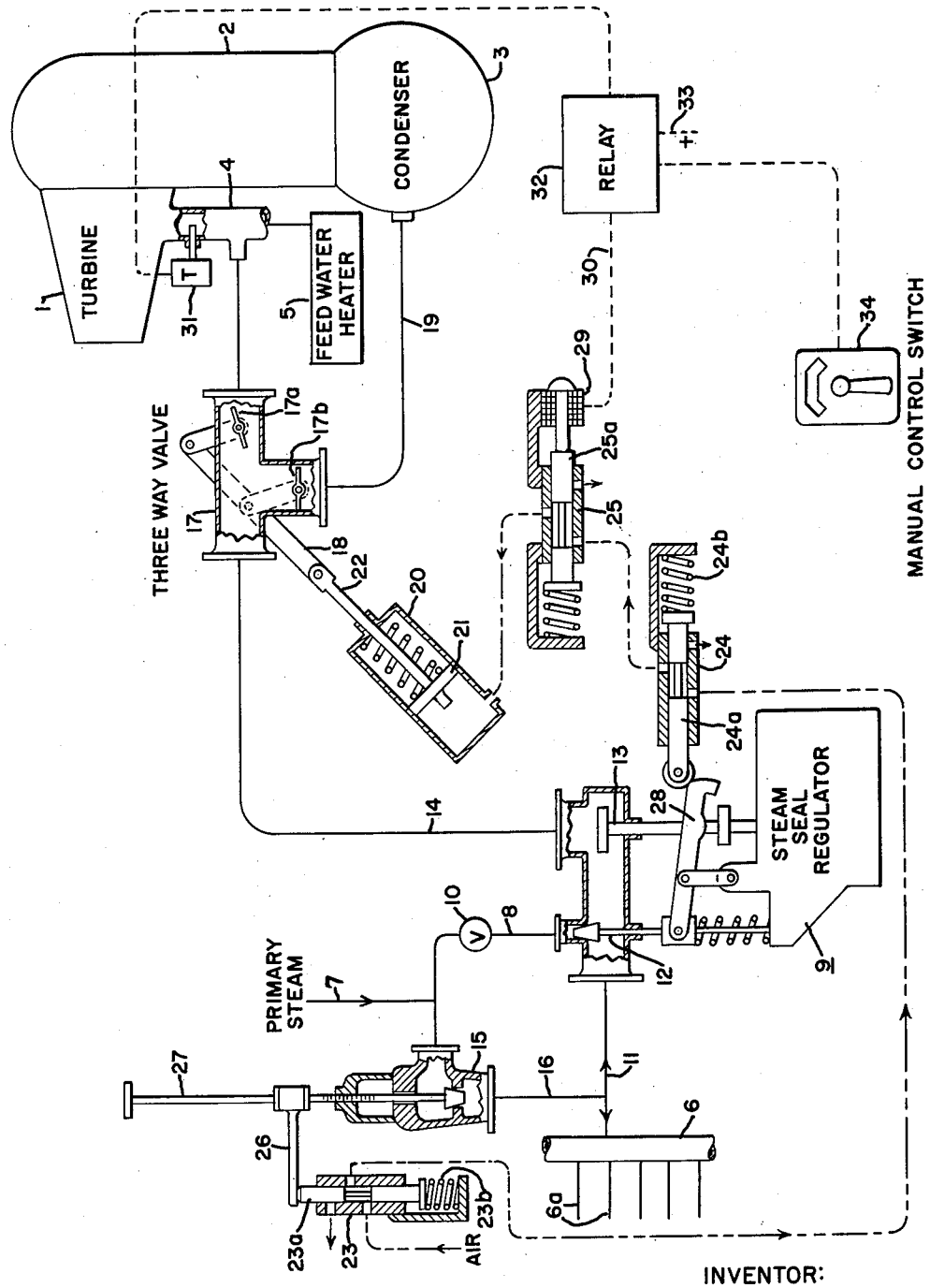

3,070,962
STEAM SEAL DIVERTING VALVE
Peter G. Ipsen, Schenectady, N.Y., assignor to General
Electric Company, a corporation of New York
Filed Nov. 6, 1961, Ser. No. 150,319
5 Claims. (Cl. 60—64)

This invention relates to steam turbine power plants of the type where high-temperature gland seal packing steam may have access, under some operating conditions, to turbine sections designed for lower temperatures, and is a system for protecting these turbine sections against unwanted entry of the gland seal steam.

The sealing of the shaft against steam leakage in a steam turbine power plant is generally accomplished by means of labyrinth-type shaft packings, which provide a series of throttlings limiting steam leakage along the rotating shaft. Some of the packings are "vacuum packings" which normally require an inflow of steam while other packings are "pressure packings" which have an outflow of steam. In order that the pressure packings can furnish steam to the vacuum packings, so that a balance in mass flow of steam in and out of different packings will occur at around half load, a common gland steam header is used to service both vacuum packings and pressure packings. At low loads, however, the pressure packings furnish insufficient steam to balance the flow and additional steam must be added. This additional steam is usually supplied from the primary steam line. Conversely, at high loads, the gland header is supplied with too much steam, and the excess must be discharged. A steam seal regulator performs the function of adding steam or discharging excess steam as required, so as to maintain a regulated pressure in the header. Excess packing steam from the header has, in some cases, been diverted to the condenser of the steam turbine.

Turbine power plants of this type often utilize low-pressure steam extracted from a relatively low-temperature, low-pressure turbine in a heat exchanger to heat the feed water. In order to improve the efficiency of the power plant, the excess gland steam has often been added to the extraction steam, thereby adding additional energy to the feed water. This invention is directed to certain problems arising in this particular arrangement under abnormal operating conditions.

If the turbine is operating at light load, and if more packing steam is supplied to the gland header than is required, the hot steam may flow backwardly through the extraction line into the turbine instead of to the feedwater heater. Since the low-pressure turbine is not designed for steam of this temperature, there is a possibility of overheating the low-pressure turbine parts.

A similar condition can occur if the feedwater heater stops operating. Excess gland seal steam which has access to the extraction line may again flow to the turbine with possible overheating.

Although the conditions mentioned above could be corrected by means of a simple temperature measuring device in the extraction line, such a device would very rarely be called upon to operate. Therefore, it is desirable that protective components be provided which are exercised automatically during normal startup and shutdown, so as to insure their complete reliability. Accordingly, one object of the present invention is to provide an arrangement for protecting the low-pressure turbine parts from unwanted entry of gland seal steam.

Another object of the invention is to provide an arrangement for obtaining the increased efficiency resulting when excess gland seal steam is mixed with the extraction steam to heat the feedwater, while providing means to protect the turbine under abnormal operating conditions.

Another object of the invention is to provide components protecting the low-pressure turbine against unwanted entry of high-temperature steam, where the components are periodically exercised.

A more specific object of the invention is to provide an arrangement which mixes excess gland seal steam with the extraction steam but which diverts excess gland seal steam to the condenser under certain conditions which might cause unwanted entry of the gland seal steam or primary steam into the low-pressure turbine.

The subject matter which is regarded as the invention is particularly pointed out and distinctly claimed in the concluding portion of the specification. The invention, however, both as to organization and method of practice, together with further objects and advantages thereof, may best be understood by reference to the following description, taken in connection with the accompanying drawings in which the single FIGURE of the drawing is a simplified schematic view of the system.

Referring to the drawing, a low-pressure turbine section 1 is shown discharging steam through an exhaust hood 2 to a condenser 3. Turbine 1 extracts the last bit of energy from steam which has been previously expanded in other turbine sections (not shown). Since turbine 1 operates at relatively low steam pressures, usually below atmospheric pressure and in a saturated condition, the rotating parts are not designed for high temperatures. A small amount of feedwater heating steam is extracted from turbine 1 through an extraction line 4, and is employed to supply heat to the condensate in feedwater heater 5 in a well-known manner. The extraction pressure in extraction line 4 may be of the order of 10 pounds per square inch absolute.

The shaft packings of the various turbine sections (not shown) are supplied with gland sealing steam. The gland steam is often maintained at a regulated pressure, for example on the order of 4 pounds per square inch gage, in a gland header, such as indicated at 6. Gland header 6 supplies gland seal steam to or accepts steam from the packings (not shown) through conduits 6a. The steam for gland header 6 is furnished from a source of high-pressure, high-temperature primary steam (not shown) through a pipe 7, and pipe 8, to a steam seal regulator indicated generally as 9. A manual valve 10 may be employed to cut off the flow of steam to regulator 9.

Gland header conduits 6a are connected to packing chambers of different pressure levels in such a way that at a given constant load, there is no need for adding steam to header 6. However, variable loadings on the turbine dictate the need for a gland seal steam regulator 9. The details of the regulator 9 are not material to the present invention. A suitable regulator for this purpose is disclosed in U.S. Patent 2,681,044, issued to M. A. Eggenberger on June 15, 1954, and assigned to the assignee of the present application. Regulator 9 maintains a constant pressure in gland header 6 by means of a steam seal feed valve 12. Regulator 9 also includes an unloading valve 13 which discharges excess steam to a discharge pipe 14 when there is excess steam in header 6. Normally, steam seal feed valve 12 will be closed when unloading valve 13 is open, and vice versa, but there is always a possibility in unusual cases that steam seal feed valve 12 might stick in an open position at the same time that unloading valve 13 is open. In this case, primary steam would flow from the high-pressure inlet pipe 8 to the regulator discharge pipe 14.

A manually-operated regulator bypass valve 15 is provided to supply primary steam from pipe 7 directly to gland header 6 through a pipe 16. Bypass valve 15 may be used under emergency conditions to supply gland seal steam if regulator 9 becomes inoperative. However, when the operator opens manual bypass valve 15, and if unloading valve 13 in the regulator 9 is open, hot steam can also flow through pipes 16, 11, through the regulator 9, to discharge pipe 14.

Under normal operating conditions, however, for example above 50% load, it is greatly desirable for excess gland seal steam to flow through pipe 14 to extraction line 4, where it mixes with the extraction steam so as to supply additional energy to heat the feedwater in feedwater heater 5.

According to the present invention, a three-way valve 17 is interposed in pipe 14 between regulator 9 and extraction line 4. Three-way valve 17 may be of any suitable type sufficient to pass the designed steam flow, but as shown here comprises two butterfly valves 17a, 17b operated by a single actuator rod 18. The butterfly valves are arranged in a manner which will be obvious from the drawing, so that valve 17a is open when valve 17b is closed, and vice versa. The normal operating position of three-way valve 17 is as shown, with butterfly valve 17a open to admit excess gland steam from line 14 to mix with extraction steam in line 4.

The alternate outlet of valve 17 controlled by butterfly valve 17b is connected to condenser 3 by means of a pipe 19. Thus, when the actuator rod 18 is moved to the other position, steam will flow from line 14 through pipe 19 to condenser 3, rather than to extraction line 4.

Three-way valve 17 is operated by a servo motor which may be of any suitable type, but as shown comprises an air cylinder 20 having a spring-loaded piston 21 connected to actuator 18 by piston rod 22. When air is supplied to the lower end of cylinder 20, the air pressure holds three-way valve 17 in the position shown. When air pressure is released in cylinder 20, the spring will move three-way valve 17 so as to divert steam from pipe 14 to condenser 3.

The air which holds the piston 21 against its spring in cylinder 20 is furnished from a source of high-pressure air (not shown) at a pressure which may be on the order of 80 p.s.i. The air flow is indicated as taking place through pipes indicated by dot-dash lines, and flows in the direction shown by the arrows through three pilot valves in succession indicated at 23, 24, 25 respectively. All three pilot valves 23–25 are arranged to provide free communication for the air from the high-pressure source to cylinder 20 under normal operating conditions. Any one of the series-connected pilot valves, however, may discharge air from cylinder 20 and divert steam to the condenser when any one of three selected abnormal operating conditions occur.

Referring first to pilot valve 23, it will be seen that the valve is arranged to discharge air from cylinder 20 unless the stem 23a is held down against the action of a spring 23b. However, if pilot valve stem 23a is held down in the position shown, air can flow freely to cylinder 20 unless the remaining pilot valves 24, 25 block the flow. Valve stem 23a is held down by a projection 26 which is raised and lowered when the handle 27 of bypass valve 15 is manually operated. Thus, whenever bypass valve 15 is open, so that primary steam from line 7 might flow into pipe 14, pilot valve 23 unloads, thus operating three-way valve 17 to divert the steam to condenser 3.

The second pilot valve 24 is cam-operated by a lever 28 actuated by the stem of steam seal feed valve 12. Whenever the steam seal feed valve 12 is open, lever 28 moves pilot valve stem 24a to compress the spring 24b so as again to operate the three-way valve to divert steam to the condenser.

The third pilot valve 25 has a spring-loaded stem 25a actuated by a solenoid 29. When the solenoid is energized through electrical leads indicated by dashed line 30, stem 25a is held against the spring to permit three-way valve 17 to remain in the left-hand position as shown. When the power in leads 30 is removed, the air is dumped from the cylinder 20 and three-way valve 17 again diverts steam to the condenser. The power in leads 30 to solenoid 29 is controlled by a temperature-responsive device measuring the steam temperature in extraction line 4. This is indicated by a thermostat 31 which operates a relay 32 supplied with a suitable source of electrical energy (not shown) through leads 33. Relay 32 is connected to energize solenoid 29 through leads 30, 33 when thermostat 31 indicates that the steam in extraction line 4 is at a safe operating temperature. Relay 32 may also be provided with a manual control knob 34 which can be used to test the operation of three-way valve 17.

The operation and advantages of the protective system are as follows. The drawing indicates the valve positions when the turbine is under full load conditions. No primary steam is entering header 6. Under these operating conditions, the steam pressure in gland header 6 is regulated by regulator 9 and excess steam is being supplied to pipe 14, flowing through three-way valve 17 to mix with the extraction steam in extraction line 4. This addition of heat energy to the extraction steam improves the efficiency. Three-way valve 17, however, is arranged to divert steam from pipe 14 to the condenser, thereby protecting the blading and other members in low-pressure turbine 1, whenever certain operating conditions, as explained below, would raise the temperature in extraction line 4 to abnormal levels.

Assuming that regulator 9 is operating properly, feedwater heater 5 may nevertheless cease to operate, in which case the excess gland seal steam from gland header 6 will cause the temperature in extraction line 4 to rise to unsafe levels. This will actuate thermostat 31 in solenoid-actuated valve 25 to divert the gland seal steam to the condenser.

Another condition which might damage the elements in turbine 1 occurs if steam seal feed valve 12 sticks open under light load conditions. In this case, when load is increased to the point where primary steam is no longer required, the high-temperature primary steam from pipe 7 would flow directly through the open unloading valve 13, through pipe 14, through extraction line 4, and into turbine 1. However, as explained previously, whenever steam seal feed valve 12 is open, the cam-operated pilot valve 24 is tripped and the three-way valve 17 is connected to divert the gland steam from pipe 14 to the condenser.

Another potentially unsafe condition can take place where the operator desires to manually admit steam through bypass valve 15. As explained above, when bypass valve 15 is opened, pilot valve 23 will discharge air from cylinder 20 which holds three-way valve 17 in the position shown, and again diverts the hot steam to the condenser.

Although three pilot valves have been shown which are actuated by three different selected operating conditions, tending to raise the temperature in the extraction conduit 4, it should be apparent that greater or fewer selected conditions could be used to operate the three-way valve. For example, high water level in feedwater heater 5 would indicate that the steam flow to the heater should be reduced so as not to overheat the low-pressure turbine. Therefore, a float-operated switch or pilot valve could be employed to actuate the three-way valve 17. Therefore, the system derives the benefits of mixing the excess gland seal steam with the extraction steam for increased efficiency, but at the same time protects the low-pressure turbine under unusual operating conditions by means of a three-way valve which passes the steam harmlessly to the condenser.

It will be observed that while only the single condition of temperature in the extraction conduit as measured by thermostat 31 might be sufficient in some cases, the three-way valve 17 and its associate servo motor would rarely be called upon to operate. Therefore, in order to insure reliability, it is preferred that components be employed which are exercised during normal startup and shutdown. It will be seen that the pilot devices 23 and 25 are actuated by the bypass valve 15 and by the regulator valve 12 respectively, which would normally be operative at low loads. These pilot devices exercise the three-way valve at these low loads where the connecting of the three-way valve to the condenser is of little consequence. However, the three-way valve is reconnected to the extraction line for good efficiency at high loads, and thus is exercised automatically.

While what has been described is felt to be the preferred embodiment of the invention, other modifications will occur to those skilled in the art, and it is of course desired to cover in the appended claims all such modifications as fall within the true spirit and scope of the invention.

What I claim as new and desire to secure by Letters Patent of the United States is:

1. In a steam turbine having steam sealed shaft packings requiring relatively high-temperature sealing steam, and including a low-pressure turbine section subject to overheating by excess sealing steam and exhausting to a condenser, the combination of:
   a steam extraction conduit connected to the low-pressure turbine section,
   a gland seal steam header containing high-temperature gland seal steam,
   regulating means maintaining a preselected pressure in said gland header and including first valve means discharging excess gland seal steam from the regulating means through a discharge outlet,
   three-way valve means including conduits connecting the regulating means discharge outlet with the extraction conduit when the three-way valve is in a first position and connecting the regulating means discharge outlet with the condenser when the three-way valve is in a second position,
   servo motor means connected to operate said three-way valve means,
   and a plurality of pilot means operatively connected to the servo motor means, each of said pilot means being actuated to cause the servo motor means to move the three-way valve means to said second position when a selected condition indicates that excessive high-temperature gland steam may be flowing through said regulating means and through the extraction conduit to the low-pressure turbine section, whereby any of said conditions will cause the three-way valve means to divert high-temperature gland seal steam from the extraction conduit to the condenser.

2. The combination according to claim 1, including a bypass valve admitting high-temperature steam around said regulating means to said gland header, and having means actuating one of said pilot means when said bypass valve is open.

3. The combination according to claim 1, wherein said regulating means includes second valve means admitting high-temperature steam to said header and means causing said second valve means to actuate one of said pilot means when the second valve means is open.

4. The combination according to claim 1, including temperature responsive means disposed in said extraction conduit, and solenoid means actuating one of said pilot means when a preselected temperature is exceeded in the extraction conduit.

5. In a steam turbine power plant having gland seal shaft packings requiring relatively high-temperature sealing steam and including a low-pressure turbine section subject to possible overheating by excessive high-temperature steam and exhausting to a condenser, the combination of:
   a steam extraction conduit connected to the low-pressure turbine section,
   a gland seal steam header furnishing sealing steam to the shaft packings,
   a source of primary high-temperature steam,
   regulating means connected between said steam source and said gland header, and including first admission valve means admitting steam to said gland header, and second discharge valve means discharging excess gland seal steam from said header,
   a bypass valve connected between said steam source and said gland header, bypassing said regulating means,
   three-way valve means including first connecting conduit means supplying excess gland seal steam from said regulating means to said extraction conduit when the three-way valve means is in a first position and also including second connecting conduit means supplying excess gland seal steam from said regulating means discharge to the condenser when the three-way valve means is in a second position,
   fluid-actuated servo means connected to operate said three-way valve means and biased toward the three-way valve second position,
   a source of actuating fluid under pressure,
   first, second and third pilot valves connected in series between said actuating fluid source and said servo means, each pilot valve being arranged to divert the source of actuating fluid from the servo means when released,
   means connected between said bypass valve and said first pilot valve to release the first pilot valve when the bypass valve is open,
   means connected between the regulating means first valve and the second pilot valve to release the second pilot valve when the regulating means first valve is open, and
   temperature responsive means disposed in said extraction conduit, including means to release said third pilot valve when a preselected temperature is exceeded in the extraction conduit.

No references cited.